W. A. BONNELL.
CONDUIT CLAMPING PLATE AND DISK.
APPLICATION FILED JUNE 23, 1913.

1,128,842.

Patented Feb. 16, 1915.

WITNESSES.
J. R. Keller

INVENTOR.
William A. Bonnell
By Ray Totten & Powell
Attys.

UNITED STATES PATENT OFFICE.

WILLIAM A. BONNELL, OF BROOKLYN, NEW YORK.

CONDUIT CLAMPING-PLATE AND DISK.

1,128,842.  Specification of Letters Patent.  Patented Feb. 16, 1915.

Application filed June 23, 1913. Serial No. 775,260.

*To all whom it may concern:*

Be it known that I, WILLIAM A. BONNELL, a citizen of the United States, and resident of Brooklyn, in the county of Kings and State of New York, have invented a new and useful Improvement in Conduit Clamping-Plates and Disks; and I do hereby declare the following to be a full, clear, and exact description thereof.

My invention relates to electric outlet boxes and is particularly concerned with an improved form of clamping plate for securing the cables of conduits in the openings or bushings in said boxes.

The improved plate as heretofore shown is applied to a box of the form illustrated in my Reissue Patent No. 13,432 granted the 25th day of June, 1912, but it is to be understood that the invention may be applied with equal effect to other forms of outlet boxes or in other relation where a clamping plate of this general character may be advantageously used.

The object of the invention is to provide a clamping plate with a knock out disk formed integral therewith, said disk being joined with the clamping plate body along a diagonal line so that when the plate is moved to clamping position by means of its actuating screw, it will not only exert a direct thrust on the side of the conduit or cable, but also a wedging action will take place between the cable and the side of the opening or bushing in the box.

Figure 1:
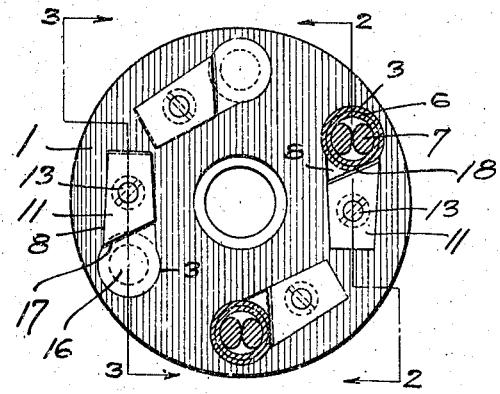
Figure 2:
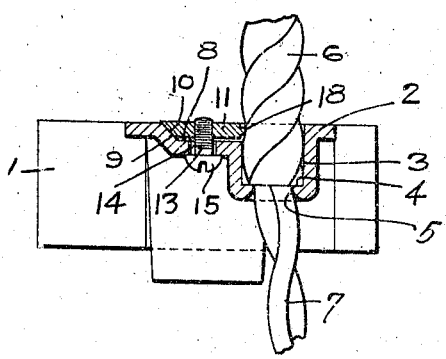
Figure 3:
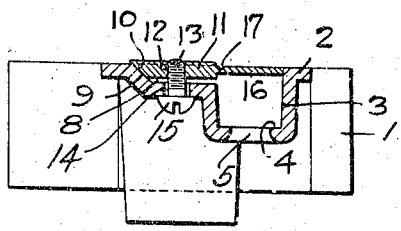
Figure 4:
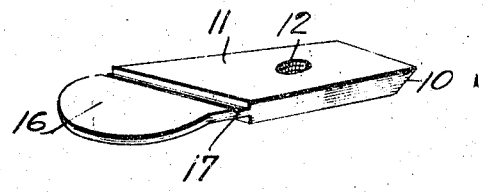
Figure 5:
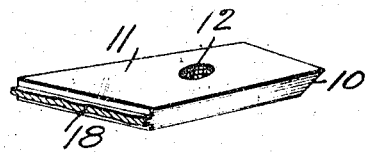

In the drawings which illustrate one embodiment of my invention Figure 1 is a face view of the back of an outlet box showing my invention applied thereto; Fig. 2 is a sectional view on the line 2—2 Fig. 1; Fig. 3 is a similar view on the line 3—3 Fig. 1; Fig. 4 is a perspective view of the clamping plate with the knock out disk attached thereto; Fig. 5 is a similar view of the plate after the knock out disk has been severed therefrom.

In the drawings 1 indicates an outlet box of the construction described in my patent referred to, said box having the rear wall or plate 2 integral with which are formed the bushings 3 terminating in a shoulder or ledge 4 for the reception of the severed end of the armor 6 of the conduit and each having an aperture or opening 5 through which the electric conductors 7 pass. In the back plate or wall of the box and adjacent each aperture or bushing is formed a clamping plate receiving recess 8 having a beveled rear wall 9 to co-act with the corresponding beveled rear wall 10 of the clamping plate 11 proper, said plate is provided with a threaded aperture 12 for the reception of a fastening screw 13 which is adapted to be inserted through a slot 14 in the base of the recess 8 where its notched head 15 may be conveniently engaged by a screw driver inserted within or from the front side of the box. This clamping plate 11 is provided with an integral knock out disk 16 joined to the body of the plate along the line 17 where a slight groove, may if desired, be formed to facilitate the severance of the disk from the plate and to form a more or less sharp edge as 18 for engagement of the armor 6 of the conduit when the disk is severed from the plate. As heretofore constructed as for example in my patent above referred to the line of junction of this knock out disk with its clamping plate is arranged at substantially right angles with the axis of the plate, meaning by axis the line of direction of movement of the plate during the clamping action, so that when the disk is severed from the plate the severed edge exerts only a direct thrust on the side of the conduit to hold the conduit in place. This for all ordinary purposes forms a perfectly secure fastening member, but I have found in practice that the holding effect of these clamping plates may be very considerably augmented by so arranging the line of junction of the disk with the plate that when the disk is severed the engaging edge of the plate will extend at an angle to the axis of the plate or diagonally across the plate whereby the engaging edge of the plate will form in effect a transverse wedge, the entering end of the side of which, 18 Fig. 1, engages between the conduit armor and the side of the opening as the plate is moved forward into the opening by means of the screw and the bevel faces 9 and 10 of the recess 8 and the plate 11 respectively. This wedging action of the clamping plate on the conduit armor not only secures the conduit firmly in place, but prevents effectively the rotating of the conduit in the box opening. Thus excessive cutting of the armor by the clamping plate is prevented.

What I claim is:

1. A clamping plate for electric conduits having a conduit engaging edge arranged diagonally of the axis of the plate to exert a wedging action on the conduit.

2. The combination with a conduit receiving receptacle having a conduit receiving opening therein, of a conduit clamping plate having a conduit engaging edge arranged diagonally to the axis of the plate, and means to cause said edge to exert a wedging action between the conduit and the wall of the conduit receiving opening.

3. An electric conduit clamping plate comprising a combined plate and knock out disk formed integral therewith, the line of junction of said disk with said plate being arranged diagonally of the axis of the plate.

4. A combined clamping plate and knock out disk, the line of junction of said disk with said plate being arranged diagonally of the axis of the plate.

5. The combination with an outlet box having a conduit receiving aperture and having a clamping plate receiving recess adjacent thereto, of a combined clamping plate and knock out disk, the line of junction of said disk with said plate being arranged diagonally of the axis of the plate whereby when said plate is moved forward to conduit engaging position said diagonal edge will exert a wedging action between the conduit and the wall of the conduit receiving aperture.

6. The combination with a conduit receiving receptacle having a conduit receiving opening therein and having a clamping plate receiving recess adjacent said opening, the rear end of said recess being beveled, of a combined clamping plate and knock out disk located in said recess, said plate having a beveled rear end to coöperate with the beveled rear end of said recess, a screw passing from the inner to the outer side of said receptacle and engaging said plate to actuate the same to clamping position along said beveled face, the line of junction of the knock out disk with said plate being arranged diagonally to the axis of the plate so that when the plate is moved forward to conduit engaging position said diagonal edge will exert the wedging action between the conduit and the side of said recess.

In testimony whereof, I the said WILLIAM A. BONNELL have hereunto set my hand.

WILLIAM A. BONNELL.

Witnesses:
 ELFREDA B. PHILIPP,
 D. P. SILER.